(12) United States Patent
Ute et al.

(10) Patent No.: US 11,527,983 B2
(45) Date of Patent: Dec. 13, 2022

(54) ELECTRIC POWER CONVERSION DEVICE

(71) Applicant: Mitsubishi Electric Corporation, Tokyo (JP)

(72) Inventors: Ryo Ute, Tokyo (JP); Hiroyuki Otsuka, Tokyo (JP); Takamasa Asai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/407,329

(22) Filed: Aug. 20, 2021

(65) Prior Publication Data
US 2022/0123682 A1   Apr. 21, 2022

(30) Foreign Application Priority Data
Oct. 20, 2020   (JP) .............................. JP2020-175730

(51) Int. Cl.
*H02P 27/06*   (2006.01)
*H02P 6/28*    (2016.01)
*H02M 7/537*   (2006.01)

(52) U.S. Cl.
CPC ............ *H02P 27/06* (2013.01); *H02M 7/537* (2013.01)

(58) Field of Classification Search
CPC ........ H02P 6/182; H02P 27/06; H02P 29/032; H02P 6/28; H02M 7/537
See application file for complete search history.

(56) References Cited

U.S. PATENT DOCUMENTS

| 10,027,269 | B2 * | 7/2018 | Khalaf ...................... H02P 6/16 |
| 2004/0012354 | A1 * | 1/2004 | Krefta ..................... F02N 11/00 318/400.41 |
| 2019/0253009 | A1 * | 8/2019 | Yamamoto .............. H02P 6/153 |

FOREIGN PATENT DOCUMENTS

JP        2004-289903 A      10/2004
JP        2006320177 A   *  11/2006

* cited by examiner

*Primary Examiner* — Thai T Dinh
(74) *Attorney, Agent, or Firm* — Sughrue Mion, PLLC; Richard C. Turner (57) ABSTRACT

An electric power conversion device includes: a first electric power conversion circuit, a current detection circuit, an electric power conversion circuit of field coil excite use, a control circuit, and detector which detects an induced electromotive force generated in the motor generator. In a case where an over current, is detected by the first electric power conversion circuit, the control circuit turns off a switching of a phase of the first electric power conversion circuit from which an over current s detected and a switching of the electric power conversion circuit of field coil excite use. After the value of an induced electromotive force by the motor generator falls below a predetermined value, the control circuit controls to stop a supply of electric power of all phases by the first electric power conversion circuit.

16 Claims, 7 Drawing Sheets

ELECTRIC POWER CONVERSION DEVICE

FIELD OF THE INVENTION

The present application relates to an electric power conversion device.

BACKGROUND OF THE INVENTION

While electric power conversion devices convert direct current electric power of direct current electric power source, such as a battery to alternating current electric power, and are used for the drive of a motor, those devices convert alternating current electric power which is generated by a motor, to direct current electric power, and are used for suppling the power to a direct current electric power source, such as a battery.

In an electric power conversion device, when a failure owing to a short circuit or the like is caused, it is commonly performed that the semiconductor switch of an electric power conversion circuit is turned off, to prevent the destruction and others of the electric power conversion device. For example, a technique is proposed in the Patent Document 1, in which common capacitors are provided in order to absorb pulse noises by the on and off of a plurality of semiconductor switches. Using those capacitors, abnormalities are detected from the change in a terminal voltage of the common capacitor or the change in a charge and discharge current. All of the semiconductor switches are controlled to be turned off, and thereby, the destruction owing to an over current is prevented.

CITATION LIST

Patent Literature

Patent Document 1: JP 2004-289903

SUMMARY OF THE INVENTION

Technical Problem

However, if all semiconductor switches are switched off, after abnormalities are detected, an electromotive force is induced in the stator coil of a motor, and a current by the electromotive force will flow into a battery side. Thereby, a rise in voltage is caused between the direct current terminals of an electric power conversion device, and the voltage may exceed the element withstanding voltage of the electric power conversion device. Therefore, it is likely that the electric power conversion device ma be destroyed.

The present application is the one which discloses a technology for solving subjects described above, and aims at offering an electric power conversion device which is capable of restraining the rise of a voltage between the direct current terminals of the electric power conversion device.

Solution to Problem

An electric power conversion device which is disclosed in the present application includes:

a first electric power conversion circuit which is connected to a motor generator and supplies electric power of a plurality of phases to the motor generator, a current detection circuit which detects a current which flows through the electric power conversion circuit, an electric power conversion circuit of field coil excite use which excites a field coil of the motor generator, a control circuit which controls switching operations of the first electric power conversion circuit and the electric power conversion circuit of field coil excite use, and detection means which is provided in the control circuit and detects an induced electromotive force generated in the motor generator, wherein, in a case where an over current is detected in the first electric power conversion circuit by the current detection circuit, the control circuit turns off a switching of a phase of the first electric power conversion circuit from which the over current is detected, and turns off a switching of a phase of the electric power conversion circuit of field coil excite use, and after a value of the induced electromotive force by the motor generator falls below a predetermined value, the control circuit controls to stop a supply of electric power of all phases by the first electric power conversion circuit, to the motor generator.

Advantageous Effects of Invention

According to the electric power conversion device which is disclosed in the present application, it becomes possible to obtain an electric power conversion device which is capable of performing a control which is conscious of a rise in voltage by an induced electromotive force, where the induced electromotive force is generated in the stator coil of a motor, when the switching operation of an electric power conversion circuit is deactivated.

DESCRIPTION OF EMBODIMENTS

Embodiment 1

Based on drawings, explanation will be made about the Embodiment 1. It is to be noted that, in each of the drawings, the same symbol indicates identical or corresponding portions.

Figure 1:
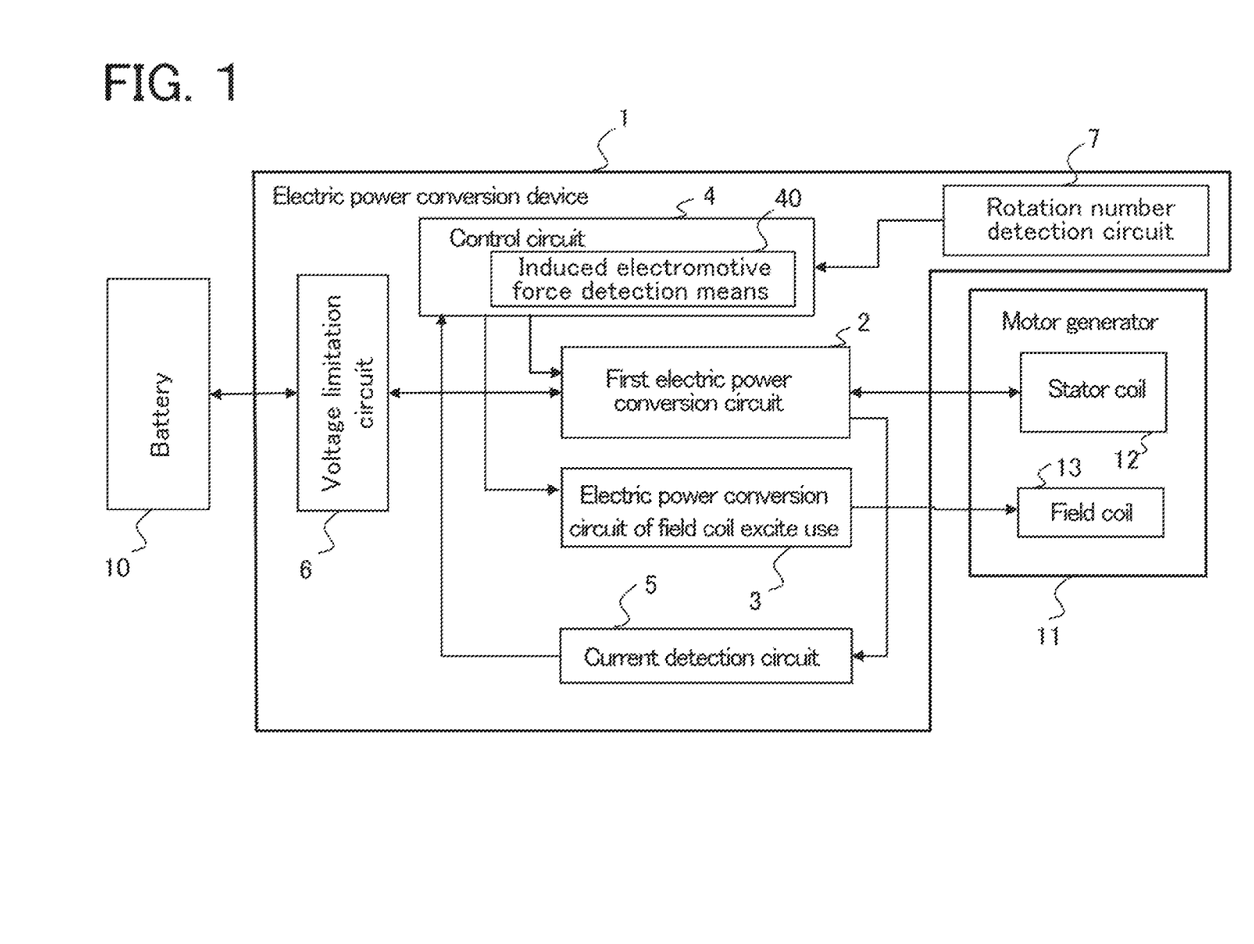
FIG. 1 is a block diagram for showing the schematic structure of an electric power conversion device in accordance with the Embodiment 1.

As the schematic construction is shown in FIG. 1, an electric power conversion device 1 according to the Embodiment 1 is connected between a battery 10 and a motor generator 11, and converts the electric power of the battery 10, and supplies the power to the motor generator 11. Moreover, the electric power conversion device is provided with a function to convert the electric power which is generated by the motor generator 11, and to supply the power to the battery 10.

On the inside of the electric power conversion device there are provided a first electric power conversion circuit 2, an electric power conversion circuit of field coil excite use 3, a control circuit 4, a current detection circuit 5, a voltage limitation circuit 6, and a rotation number detection circuit 7. The first electric power conversion circuit 2 is controlled by the control circuit 4, and conducts the sending and receiving of a current with the stator coil 12 of the motor generator 11. Moreover, the electric power conversion circuit of field coil excite use 3 is an electric power conversion circuit of single phase bridge type. This electric power conversion circuit is controlled by the control circuit 4 and supplies a current to the field coil 13 of the motor generator 11.

The output conditions of the first electric power conversion circuit 2 are detected by the current detection circuit 5, and sent to the control circuit 4. The operating conditions of the motor generator 11 are detected by the rotation number detection circuit 7, and sent to the control circuit 4.

The control circuit 4 is equipped with induced electromotive force detection means 40, and detects an induced electromotive force which is caused by the motor generator 11. When the motor generator 11 carries out a rotation operation, a back electromotive force (induced electromotive force) is generated in a coil to which a phase voltage is not applied, among coils of each phase (U phase, V phase, and W phase) of the stator coil 12. The induced electromotive force detection means 40 can detect this induced electromotive force.

When an over current is detected by the current detection circuit 5, the control circuit 4 turns off not all phases, but turns off only the output of a phase from which an over current is detected (a phase from which an abnormal condition is detected). Further, the control circuit 4 performs controls as follows; the control circuit 4 turns off the switching of the phase of the electric power conversion circuit of field coil excite use 3, and after the detection value of an induced electromotive force falls below a predetermined value, the control circuit 4 turns off the outputs of other phases. By performing such controls, the electric power conversion device can be deactivated, while the rapid rise of a voltage by an induced electromotive force is restrained.

Figure 2:
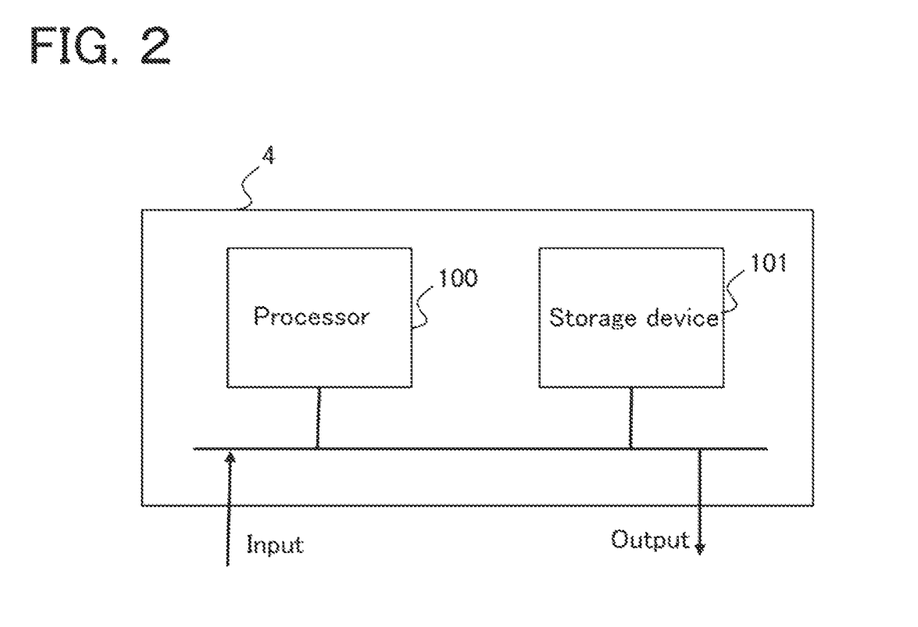
FIG. 2 is a construction diagram for showing an example of the hardware of a control circuit in accordance with the Embodiment 1.

It is to be noted that, the control circuit 4 consists of a processor 100 and a storage device 101, as an example of the hardware constitution is shown in FIG. 2. Although not illustrated in the drawing, the storage device is equipped with volatile storages, such as a random access memory, and non-volatile auxiliary storage devices, such as a flash memory. Moreover, the storage device can be equipped with an auxiliary storage device of hard disk type, instead of flash memories. The processor 100 executes a program which is input from the storage device 101. In this case, the program is transferred from an auxiliary storage device through a volatile storage, and is input in the processor 100. Moreover, the processor 100 may output the data of an operation result and others, to a volatile storage device of the storage device 101, and may save the data in the auxiliary storage device through a volatile storage device.

Figure 3:
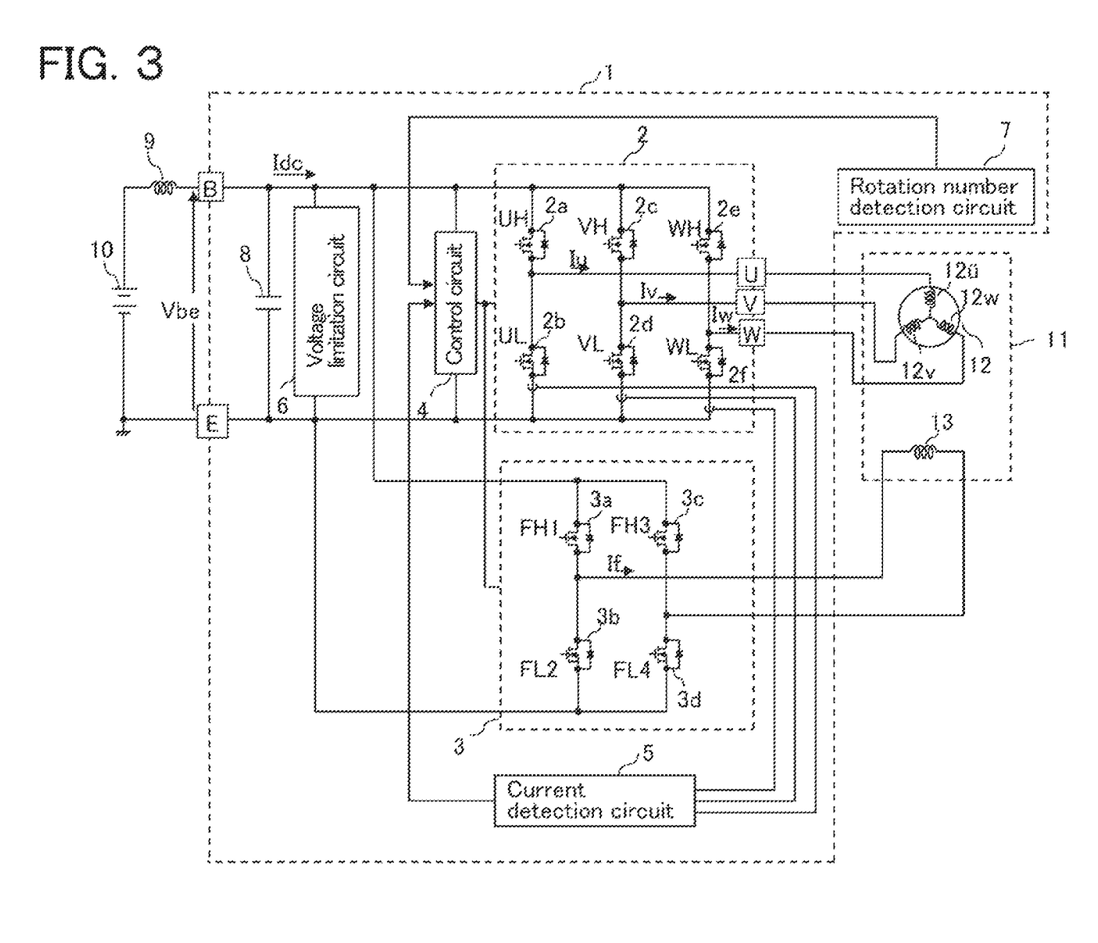
FIG. 3 is a circuit construction diagram for showing the electric power conversion device in accordance with the Embodiment 1.

FIG. 3 is a circuit construction diagram for showing in detail the construction of the electric power conversion device 1 according to the Embodiment 1. As shown in the drawing, the electric power conversion device 1 is connected with a wiring inductance 9, a battery 10, and a motor generator 11.

The electric power conversion device 1 is equipped with a first electric power conversion circuit 2, an electric power conversion circuit of field coil excite use 3, a control circuit 4, a current detection circuit 5, a voltage limitation circuit 6, a rotation number detection circuit 7, and a smoothing capacitor 8.

The first electric power conversion circuit 2 is an electric power conversion circuit, which is composed of power MOSFETs 2a to 2f of N channel type, each of which is used as a semiconductor switch. Here is shown an electric power conversion circuit of three phase bridge type, which is configured in two series and three parallel constitution Moreover, the electric power conversion circuit of field coil excite use 3 is an electric power conversion circuit of single phase bridge type, which is composed of power. MOSFETs 3a to 3d of N channel type, each of which is used as a semiconductor switch.

Explanation will be made about the operation of the electric power conversion device 1. Direct current electric power of the battery 10 is converted to alternating current electric power, by the first electric power conversion circuit 2 and alternating currents Iu, Iv, and Iw flow in the first stator coil 12. Thereby, a revolving magnetic field is produced to drive the motor generator 11. At this time, an exciting current If is supplied to the field coil 13 by the electric power conversion circuit of field coil excite use 3. The alternating current electric power which is generated by the motor generator 11 is converted to direct current electric power by the first electric power conversion circuit 2, and is supplied to the battery 10.

In the electric power conversion device 1, the direct current side terminal B of high potential side and the direct current side terminal E of low potential side are connected respectively to the positive terminal and the negative terminal of the battery 10. It is to be noted that, the wiring inductance 9 expresses a total of parasitic inductances by the wirings at a high potential side and a low potential side, which connect the electric power conversion device 1 with the battery 10.

The first electric power conversion circuit 2 includes both ends and middle points of the two series constitution, which are connected to the direct current side terminals B and E of the electric power conversion device 1 and to the alternating current side terminals U, V and W.

The electric power conversion circuit of field coil excite use 3 includes both ends and middle points of the two series constitution, which are connected to the direct current side terminals B and E of the electric power conversion device 1 and to the both ends of a field coil 13.

The power MOSFETs 2a to 2f and the power MOSFETs 3a to 3d have a first main terminal (drain a second main terminal (source), and a control terminal (gate), and the on-off control of those power MOSFETs is carried out by the voltage between a gate and a source. Those power MOSFETs become, at an on time, resistive elements which can conduct a current bidirectionally between a drain and a source, and become, at an off time, diode elements which can conduct a current only in a direction from a source to a drain.

The motor generator 11 is a field winding type motor generator which is composed of a first stator coil 12 and a field coil 13. The motor generator 11 includes the stator windings 12u, 12v, and 12w of U phase, V phase, and W phase, which are connected to the alternating current side terminals U, V, and W of the first electric power conversion circuit 2.

Based on an instruction from an upper level ECU (not shown in the drawing), the current detection circuit 5 and the rotation number detection circuit 7, and various sensor information (not shown in the drawing), the control circuit 4 carries out an on and off control to the power MOSFETs 2a to 2f of the first electric power conversion circuit 2 and the power MOSFETs 3a to 3d of the electric power conversion circuit of field coil excite use 3.

The current detection circuit 5 detects a current which flows through each phase of the first electric power conversion circuit 2, and transmits current information on each phase to the control circuit 4. Moreover, when a state in which the value of a current which flows through each phase of the first electric power conversion circuit 2 is larger than a predetermined value continues for more than a predetermined time, the current detection circuit 5 issues an over current detection to the control circuit 4, to notify that an over current is detected.

The rotation number detection circuit 7 detects the rotation number of the motor generator 11, and transmits the information on the rotation number to the control circuit 4.

The voltage limitation circuit 6 is connected between the direct current side terminal B and the direct current side terminal E of the electric power conversion device 1. This voltage limitation circuit 6 plays a role to limit the voltage Vbe between the direct current side terminals B and B to a voltage below a predetermined value, when a large current is supplied from the battery 10 to the first electric power conversion circuit 2. As an example of this voltage limitation circuit 6, a circuit which has a voltage limitation function by use of a Zener diode is held up.

Moreover, a smoothing capacitor 8 is connected between the direct current side terminal B and the direct current side terminal E of the electric power conversion device 1. This smoothing capacitor 8 plays a role to smooth the electric power which is supplied from the battery 10 to the first electric power conversion circuit 2, and in addition, to reduce high frequency noises which result from the switching of the power MOSFETs 2a to 2f.

Figure 4:
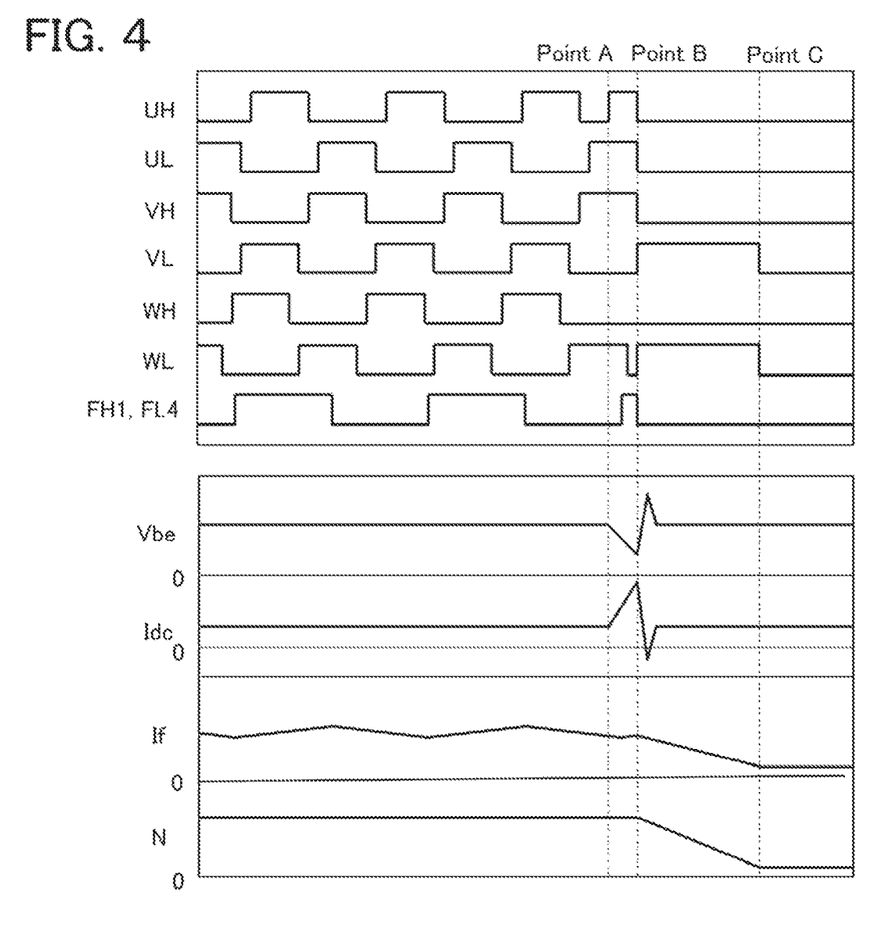
FIG. 4 is an explanatory diagram of operating waveforms in each part of the electric power conversion device in accordance with the Embodiment 1.

Next, it is supposed that the motor generator 11 is activated in the composition of FIG. 3. Under such a situation, explanation will be made about operating waveforms of each part, when an over current is detected owing to a short circuit fault which is caused in an arbitrary phase. FIG. 4 represents the operating waveforms of each part according to the Embodiment 1.

In FIG. 4, UH, UL, VH, VL, WH, and WL show the on and off logics of the power MOSFETs 2a to 2f of the first electric power conversion circuit 2, which is controlled by the control circuit 4, where High indicates an on state and Low indicates an off state. It is to be noted that, with respect to the timing when the on and off of the power MOSFETs of the same phase (2a and 2b, 2c and 2d, 2e and 2f) are switched, a time (dead time) is secured for preventing the same phase arm short circuit by a simultaneous on.

Moreover, FH1 and FL4 show the on and off logics of the power MOSFET 3a and power MOSFET 3d of the electric power conversion circuit of field coil excite use 3, which is controlled by the control circuit 4, where High indicates an on state and Low indicates an off state. It is to be noted that, although not indicated in FIG. 4, the power MOSFET 3b and the power MOSFET 3c are used as diode elements, by issuing always an off signal from the control circuit 4. Those power MOSFETs circulate a current to the battery 10, which flows through a field coil when the power MOSFET 3a and the power MOSFET 3d are during an off period.

Moreover, Vbe indicates a voltage between the direct current side terminal B and the direct current side terminal E of the electric power conversion device 1. Moreover, Idc indicates a current which flows through a high potential side direct current line of the first electric power conversion circuit 2, and If indicates a current which flows from the electric power conversion circuit of field coil excite use 3 to the field coil 13. Further, N indicates a rotation number of the motor generator 11.

Next, explanation will be made about operations of each part, in a case where an arbitrary phase of the first electric power conversion circuit 2 causes a short circuit fault, and an over current is detected. As an example, a case will be explained in which the power MOSFET 2a of UH is incorrectly turned on, and the power MOSFET 2a of UH and the power MOSFET 2b of UL become a simultaneous on state, and a short circuit is caused between the direct current side terminal B and the direct current side terminal E of the electric power conversion device 1.

When the power MOSFET 2a of UH is incorrectly turned on, at Point A (refer to 4) where the motor generator 11 is during a drive operation, a short circuit current flows from the battery 10 to the U phase. The short circuit current increases and the current, whose value is beyond a predetermined value, continues to flow for more than a predetermined time. Thereby, an over current of U phase is detected by the current detection circuit 5. At this time, an over current condition of U phase is transmitted from the current detection circuit 5 to the control circuit 4.

Next, at Point B (refer to FIG. 4), the power MOSFET 2a and the power MOSFET 2b of U phase, from which an over current is detected, are turned off. Further, as for the V phase and the W phase from which an over current is not detected, the power MOSFET 2c of VH and the power MOSFET 2e of WH are turned off, and the power MOSFET 2d of VL and the power MOSFET 2f of WL are turned on. By performing such switching controls, an induced electromotive force is induced in the stator coil 12u of U phase, which causes a current to flow. The current passes through the body diode of the power MOSFET 2a of UH and flows into the battery 10.

However, currents which are caused to flow by induced electromotive forces, which are induced in the stator coil 12v of V phase and the stator coil 12w of W phase, pass through the power MOSFET 2d of VL and the power MOSFET 2f of WL. Those currents circulate through each of the stator coil 12v and the stator coil 12w, and thereby, are consumed as heat.

Therefore, a back electromotive force serge which occurs in the wiring inductance 9 at Point B (refer to FIG. 4), is generated only by the current which flows from the short circuited stator coil 12u of U phase into the battery 10. The rise of a voltage between direct current terminals Vbe can be restrained, as compared with the control in which power MOSFETs of all phases are turned off at once.

Moreover, at the same time, the power MOSFET 3a (FH1) and the power MOSFET 3d (FL4) of field coil excite use are turned off at Point B (refer to FIG. 4) to reduce an exciting current If. Further, the rotation number N of the motor generator 11 is also reduced.

Next, at Point C (refer to FIG. 4), the values of an exciting current If and a rotation number N fall below predetermined values, and after the value of an induced electromotive force which is induced from the field coil 13 to the first stator coil 12 falls below a predetermined value, the power MOSFETs 2*a* to 2*f* of the first electric power conversion circuit 2 are turned off. Thereby the current which flows from the first stator coil 12 into the battery 10 is restrained, and the rise of a voltage between direct current terminals Vbe can be restrained, also when the electric power conversion device 1 is deactivated. It is to be noted that, the induced electromotive force is estimated by the control circuit 4, from an exciting current If and a rotation number N, and the inductance value of the stator coil 12.

As mentioned above, according to the Embodiment 1, when an over current is detected in the first electric power conversion circuit 2, upper arm and lower area power MOSFETs of a phase from which an over current is detected are turned off. As for the phase from which an over current is not detected, an upper arm power MOSFET is turned off and a lower arm power MOSFET is turned on, and the power MOSFET 3*a* and the power MOSFET 3*d* of field coil excite use are turned off. After the value of an induced electromotive force which is induced from the field coil 13 in the first stator coil 12 falls below a predetermined value, the power MOSFET of the first electric power conversion circuit 2 is turned off. Thereby the rise of a voltage between direct current terminals Vbe can be restrained, as compared with a case in which all power MOSFETs are turned off immediately after an over current is detected. Further, the electric power conversion device 1 can be deactivated safely while the destruction of elements is prevented.

Embodiment 2

In the Embodiment 1, explanation is made about a method of deactivating an electric power conversion device, at the time when an over current is detected, in the electric power conversion device which has one electric power conversion circuit of three phase bridge type. By contrast with the Embodiment 1, in the Embodiment 2, explanation will be made about an electric power conversion device which has two sets of electric power conversion circuits of three phase bridge type.

Figure 5:
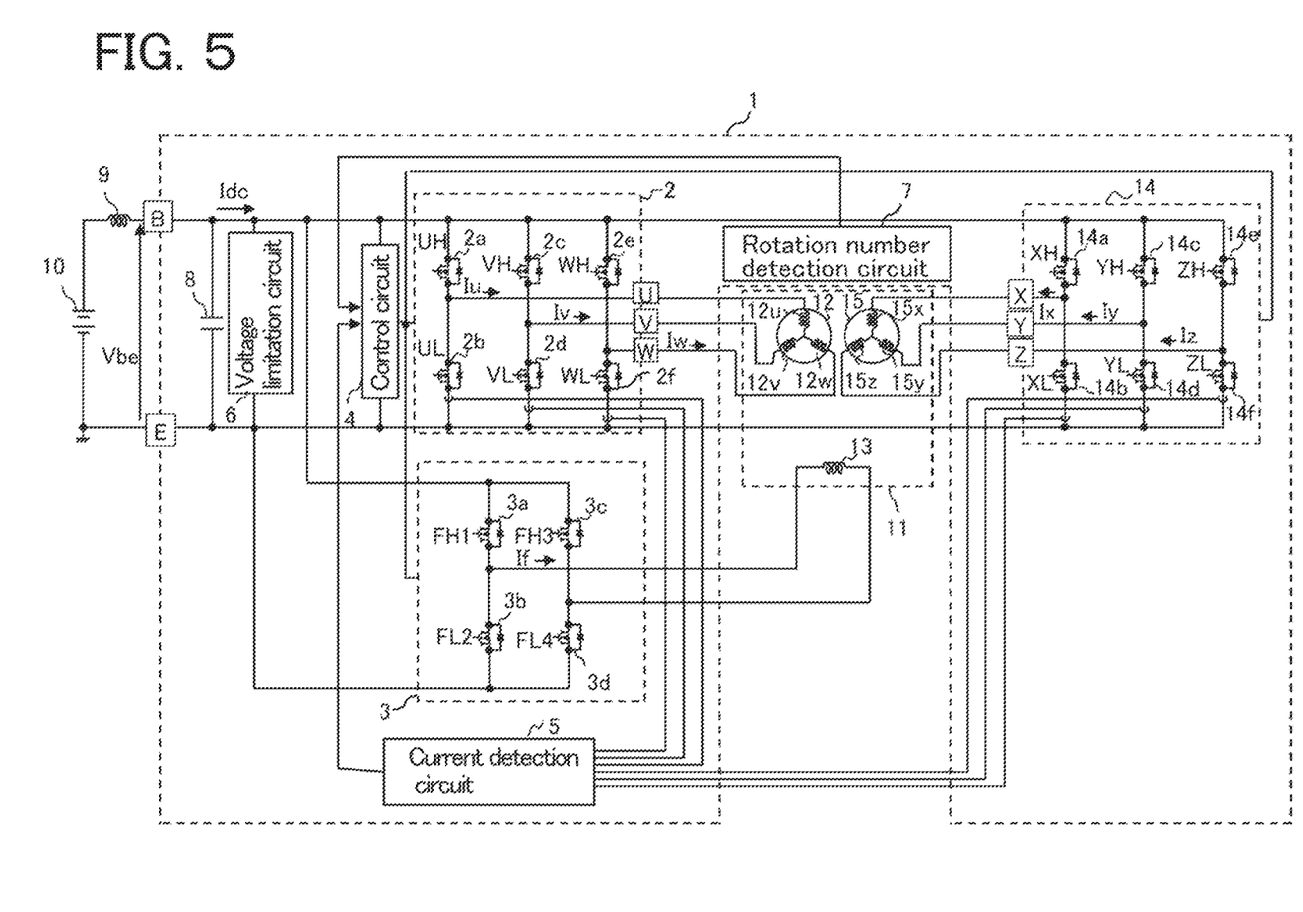
FIG. 5 is a circuit construction diagram for showing an electric power conversion device in accordance with the Embodiment 2.

FIG. 5 shows the composition of an electric power conversion device which is equipped with two sets of electric power conversion circuits of three phase bridge type according to the Embodiment 2.

In this Embodiment 2, the electric power conversion device 1 is equipped with a second electric power conversion circuit 14, by contrast with the electric power conversion device 1 according to the Embodiment 1.

The second electric power conversion circuit 14 is an electric power conversion circuit of three phase bridge type, which employs, as a semiconductor switch, power MOSFETs 14*a*-14*f* of N channel and is configured in two series and three parallel constitution. This second electric power conversion circuit 14 includes both ends and middle points of the two series constitution, which are connected to the direct current side terminals B and E of the electric power conversion device 1 and to the alternating current side terminals X, Y, and Z.

The motor generator 11 is a field winding type motor generator which is composed of a first stator coil 12, a second stator coil 15, and a field coil 13. In the motor generator 11, the stator windings 12*u*, 12*v*, and 12*w* of U phase, V phase, and W phase are connected to the alternating current side terminals U, V, and W of the first electric power conversion circuit 2, and the stator windings 15*x*, 15*y* and 15*z* of X phase, Y phase, and Z phase are connected to the alternating current side terminals X, Y, and Z of the second electric power conversion circuit 14.

Next, it is supposed that the motor generator 11 is activated in the composition of FIG. 5. Under such a situation, explanation will be made about operating waveforms of each part, when an over current is detected owing to a short circuit, fault which is caused in an arbitrary phase.

Figure 6:
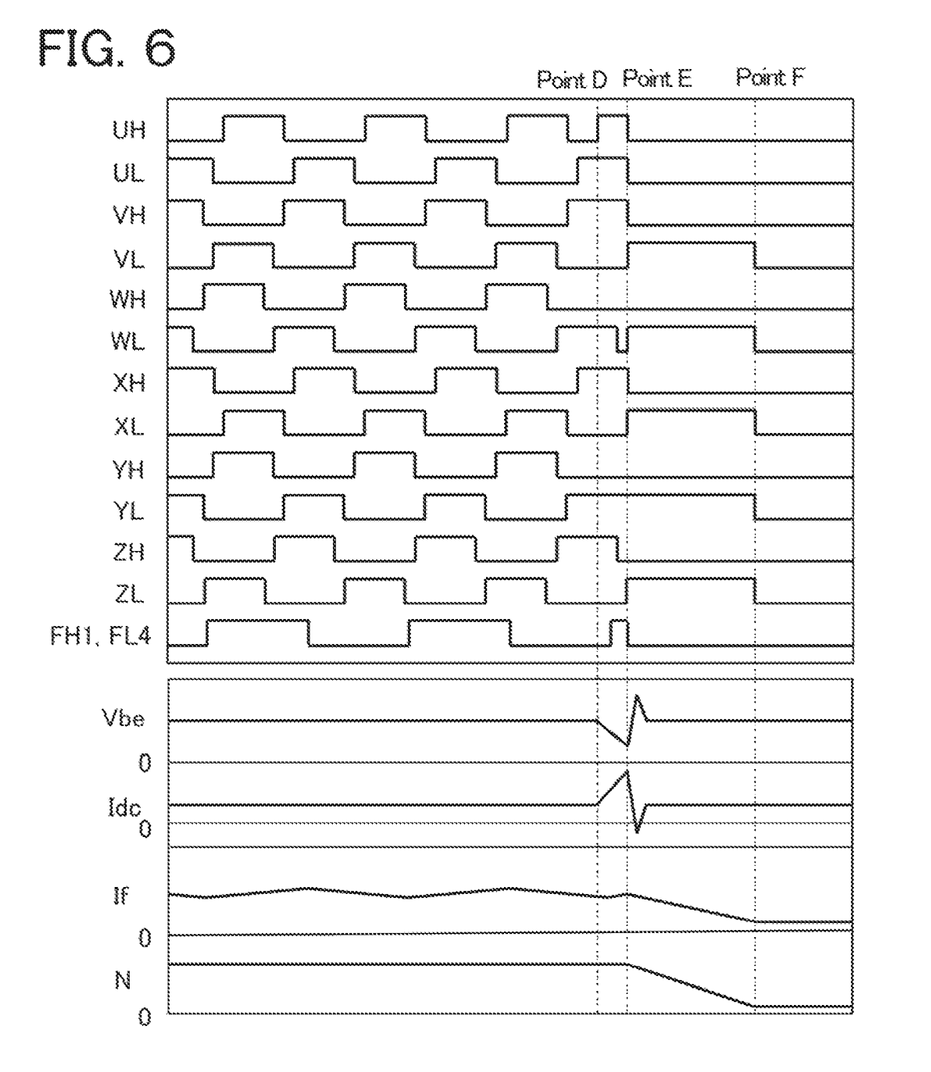
FIG. 6 is an explanatory diagram of operating waveforms in each part of the electric power conversion device in accordance with the Embodiment 2.

FIG. 6 represents the operating waveforms of each part according to the Embodiment 2.

In FIG. 6, XH, XL, YH, YL, ZH, and ZL show the on and off logics of the power MOSFETs 14*a* to 14*f* of the second electric power conversion circuit 14, which are controlled by the control circuit 4, where High indicates an on state and Low indicates an off state. It is to be noted that, with respect to the timing when the on and off of the power MOSFETs of the same phase (14*a* and 14*b*, 14*c* and 14*d*, and 14*e* and 14*f*) are switched, a time (dead time) is secured for preventing the same phase arm short circuit by a simultaneous on.

Next, explanation with be made about operations of each part, in a case where an arbitrary phase of the first electric power conversion circuit 2 causes a short circuit fault, and an over current is detected. As an example, a case will be explained in which the power MOSFET 2*a* of UH is incorrectly turned on, and the power MOSFET 2*a* of UH and the power MOSFET 2*b* of UL become a simultaneous on state, and a short circuit is caused between the direct current side terminal B and the direct current side terminal E of the electric power conversion device 1.

When the power MOSFET 2*a* of UH is incorrectly turned on, at Point D (refer to FIG. 6) where the motor generator 11 is during a drive operation, a short circuit current flows from the battery 10 to the U phase. The short circuit current increases and the current, whose value is beyond a predetermined value, continues to flow for more than a predetermined time. Thereby an over current of U phase is detected by the current detection circuit 5. At this time, the current detection circuit 5 transmits an over current state of U phase to the control circuit 4.

Next, the power MOSFET 2*a* and the power MOSFET 2*b* of U phase from which an over current is detected are turned off, at Point E (refer to FIG. 6). Moreover, as for the V phase and the W phase from which an over current is not detected, the power MOSFET 2*c* of VH and the power MOSFET 2*e* of WH are turned off, and the power MOSFET 2*d* of VL and the power MOSFET 2*f* of WL are turned on. Further, as for the second electric power conversion circuit from which an over current is not detected, the upper arm power MOSFETs 14*a*, 14*c*, and 14*e* are turned off, and the lower arm power MOSFETs 14*b*, 4*d*, and 14*f* are turned on.

By performing such switching controls, an induced electromotive force is induced in the stator coil 12*u* of U phase, which causes a current to flow. The current passes through the body diode of the power MOSFET 2*a* of UH, and flows into the battery 10. However, currents which are caused to flow by induced electromotive forces, which are induced in the stator coil 12*v* of V phase and the stator coil 12*w* of W phase, and the stator coil 15*x* of X phase, the stator coil 15*y* of Y phase, and the stator coil 15*z* of Z phase, pass respectively the power MOSFET 2*d* of VL and the power MOSFET 2*f* of WL, and the power MOSFET 14*b* of XL, the power MOSFET 14*d* of YL, and the power MOSFET 14*f* of ZL. Those currents circulate through the stator coil 12*v* of V phase and the stator coil 12*w* of W phase, and the stator coil 15*x* of X phase, the stator coil 15*y* of Y phase, and the stator coil 15*z* of Z phase, and thereby, are consumed as heat.

Therefore, a back electromotive force serge which occurs by the wiring inductance 9 at Point E (refer to FIG. 6) is generated only by a current which flows from the short circuited stator coil 12*u* of U phase into the battery 10. The rise of a voltage between direct current terminals Vbe can be restrained, as compared with the control in which power MOSFETs of all phases are turned off at once.

Moreover, at the same time, the power MOSFET 3a (FH1) and the power MOSFET 3d (FL4) of field coil excite use are turned off, at Point E (refer to FIG. 6), and the exciting current If is reduced. Further, the rotation number N of the motor generator 11 is also reduced.

Next, the values of the exciting current If and the rotation number N fall below predetermined values at Point F (refer to FIG. 6). After the values of induced electromotive forces which are induced from the field coil 13 to the first stator coil 12 and the second stator coil 15 fall below predetermined values, the power MOSFETs 2a to 2f of the first electric power conversion circuit 2 and the power MOSFETs 14a-14f of the second electric power conversion circuit 14 are turned off. Thereby, currents which flow from the first stator coil 12 and the second stator coil 15 into the battery 10 are restrained, and the rise of a voltage between direct current terminals Vbe can be restrained, also when the electric power conversion device 1 is deactivated.

As mentioned above, according to the Embodiment 2, when an over current is detected in the first electric power conversion circuit 2, upper arm and lower arm power MOSFETs of a phase from which an over current is detected are turned off. As for a phase from which an over current is not detected, an upper arm power MOSFET is turned off and a lower arm power MOSFET is turned on. As for the second electric power conversion circuit 14 from which an over current is not detected, an upper arm power MOSFET is turned off and in addition, a lower arm power MOSFET is turned on, and the power MOSFET 3a and the power MOSFET 3d of field coil excite use are turned off.

After the values of induced electromotive forces which are induced from the field coil 13 to the first stator coil 12 and the second stator coil 15 fall below predetermined values, the power MOSFETs of the first electric power conversion circuit 2 and the second electric power conversion circuit 14 are turned off. Thereby as compared with a case in which all of the power MOSFETs are turned off immediately after an over current is detected, the rise of a voltage between direct current terminals Vbe can be restrained. Further, the electric power conversion device 1 can be deactivated safely while the destruction of elements is prevented.

Embodiment 3

In the previous Embodiment explanation is made about the deactivation of an electric power conversion device, at the time when an over current is detected in the electric power conversion device which has two sets of electric power conversion circuits of three phase bridge type. By contrast with this embodiment, in the Embodiment 3, explanation will be made about a case in which power MOSFETs of the electric power conversion circuit from which an over current is detected are controlled in a different operating way to acquire the same effect, where those power MOSFETs are in the same circuit construction as in the Embodiment 2.

The constitution drawing of the electric power conversion device which is equipped with two sets of electric power conversion circuits of three phase bridge type according to the Embodiment 3 is the same as the previous FIG. 5.

Figure 7:
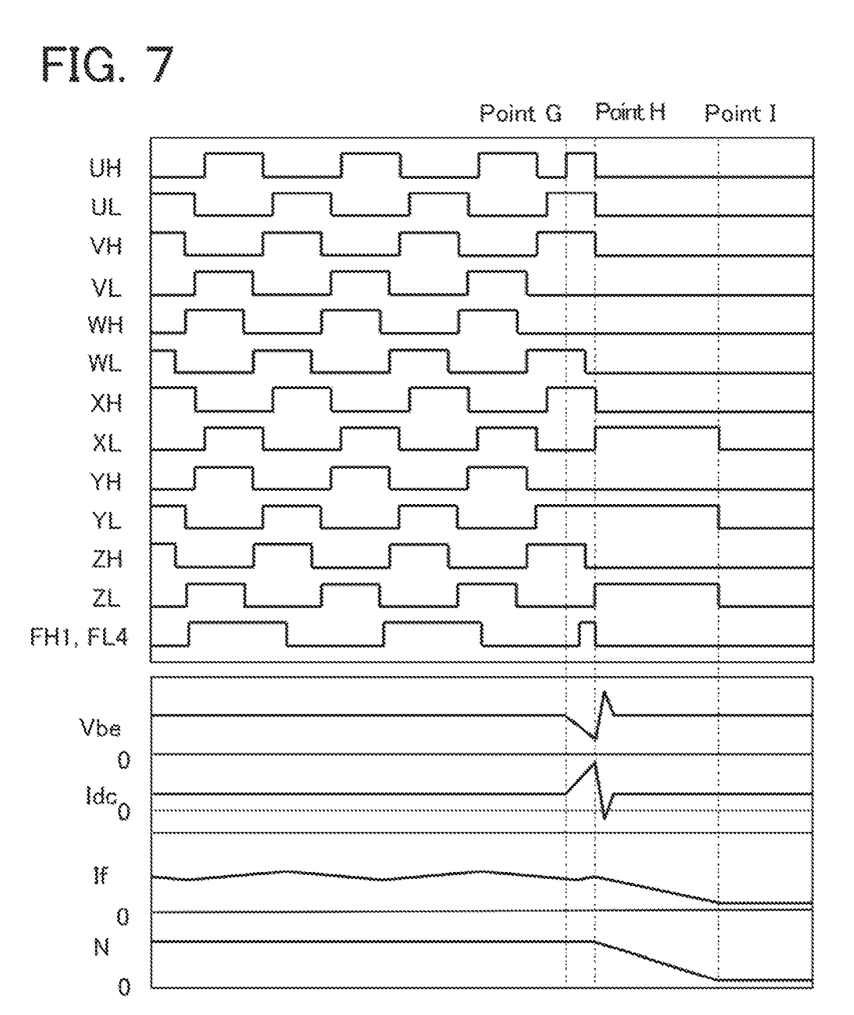
FIG. 7 is an explanatory diagram of operating waveforms in each part of an electric power conversion device in accordance with the Embodiment 3.

In the constitution of FIG. 5, explanation will be made about operating waveforms in each part, when an over current is detected in an arbitrary phase owing to a short circuit fault, in a case where the motor generator 11 is activated. FIG. 7 represents the operating waveforms of each part according to the Embodiment 3.

Next, explanation will be made about operations of each part, in a case where an arbitrary phase of the first electric power conversion circuit 2 causes a short circuit fault and an over current is detected. As an example, explanation will be made about a case in which the power MOSFET 2a of UH is incorrectly turned on, and the power MOSFET 2a of UH and the power MOSFET 2b of UL become a simultaneous on state, and a short circuit is caused between the direct current side terminal B and the direct current side terminal E of the electric power conversion device 1.

When the power MOSFET 2a of UH is incorrectly turned on, at Point G (refer to FIG. 7) where the motor generator 11 is during a drive operation, a short circuit current flows from the battery 10 to the U phase. The short circuit current increases and the current, whose value is beyond a predetermined value, continues to flow for more than a predetermined time. Thereby an over current of U phase is detected by the current detection circuit 5. At this time, the current detection circuit 5 transmits an over current state of U phase to the control circuit 4.

Next, the power MOSFETs 2a to 2f of the first electric power conversion circuit 2 from which an over current is detected are turned off, at Point H (refer to FIG. 5). Further, as for the second electric power conversion circuit from which an over current is not detected, the upper arm power MOSFETs 14a, 14c, and 14e are turned off, and the lower arm power MOSFETs 14b, 14d, and 14f are tuned on. By performing such switching controls, an induced electromotive force is induced in the stator coil 12 which is connected to the first electric power conversion circuit 2, and a current is caused to flow by the induced electromotive force. The current passes through the body diodes of the upper arm power MOSFETs 2a, 2c, and 2e of the first electric power conversion circuit 2, and flows into the battery 10.

However, currents which are caused to flow by induced electromotive forces, which are induced in the stator coil 15x of X phase, the stator coil 15y of Y phase, and the stator coil 15z of Z phase, pass respectively through the power MOSFET 14b of XL, the power MOSFET 14d of YL, and the power MOSFET 14f of ZL. Those currents circulate respectively through the stator coil 15x of X phase, the stator coil 15y of Y phase, and the stator coil 15z of Z phase, and thereby are consumed as heat. Therefore, a back electromotive force serge which occurs by the wiring inductance 9 at Point H (refer to FIG. 7), is generated only by a current which flows into the battery 10 from the stator coil 12 which is connected to the first electric power conversion circuit 2 from which an over current is detected. Then, the rise of a voltage between direct current terminals Vbe can be restrained, as compared with the control in which power MOSFETs of all phases are turned off at once.

Further, at the same time, the power MOSFET 3a (FH1) and the power MOSFET 3d (FL4) of field coil excite use are turned off, at Point H (refer to FIG. 7), and the exciting current If is reduced. Further, the rotation number N of the motor generator 11 is also reduced.

Next, the values of the exciting current If and the rotation number N fall below predetermined values at Point I (refer to FIG. 7), after the values of an induced electromotive force which is induced from the field coil 13 to the first stator coil 12 and to the second stator coil 15 fall below predetermined values, the power MOSFETs 2a to 2f of the first electric power conversion circuit 2 and the power MOSFETs 14a to 14f of the second electric power conversion circuit 14 are turned off. Thereby, currents which flow from the first stator coil 12 and the second stator coil 15 into the battery 10 are restrained, and the rise of a voltage between direct current, terminals Vbe can be restrained, also when the electric power conversion device 1 is deactivated.

As mentioned above, according to the Embodiment 3, when an over current is detected in the first electric power conversion circuit 2, upper arm and lower arm power MOSFETs of the first electric poorer conversion circuit 2 are turned off. As for the second electric power conversion circuit 14 from which an over current is not detected, an upper arm power MOSFET is turned off and in addition, a lower arm power MOSFET is turned on. The power MOSFET 3a and the power MOSFET 3d of field coil excite use are turned off. After the values of induced electromotive forces, induced from the field coil 13 to the first stator coil 12 and to the second stator coil 15 fall below predefined values, the power MOSFETs of the first electric power conversion circuit 2 and the second electric power conversion circuit 14 are turned off. By performing such controls, as compared with a case in which all power MOSFETs are turned off immediately after an over current is detected, the rise of a voltage between direct current terminals Vbe can be restrained, and the electric power conversion device 1 can be deactivated safely, while the destruction of elements is prevented.

It is to be noted that, in the Embodiments 1 to 3, explanation is made about a case in which, as for the phase from which an over current is not detected, an upper arm power MOSFET is turned off and in addition, a lower arm power MOSFET is turned on. However, contrary to this explanation, as for the phase from which an over current is not detected, it is also acceptable that an upper arm power MOSFET is turned off and in addition, a lower arm power MOSFET is turned off. Also by performing such controls, a current which flows through the stator coil of a phase in which an over current is not detected circulates through the inside of a stator coil, without flowing into the battery 10. Thereby, a back electromotive force serge which occurs in the wiring inductance 9 is restrained, and the rise of a voltage between direct current terminals Vbe can be restrained at the time when an over current is detected.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

1 Electric power conversion device: 2 First electric power conversion circuit: 2a to 2f Power MOSFET: 3 Electric power conversion circuit of field coil excite use: 3a to 3d Power MOSFET: 4 Control circuit: 5 Current detection circuit: 6 Voltage limitation circuit: 7 Rotation number detection circuit: 8 Smoothing Capacitor 9 Wiring inductance: 10 Battery: 11 Motor generator: 12 First stator coil: 13 Field coil: 14 Second electric power conversion circuit: 15 Second stator coil: 40 Induced electromotive force detection means

What is claimed is:

1. An electric power conversion device comprising:
   a first electric power conversion circuit which is connected to a motor generator and supplies electric power of a plurality of phases to the motor generator,
   a current detection circuit which detects a current which flows through the electric power conversion circuit,
   an electric power conversion circuit of field coil excite use which excites a field coil of the motor generator,
   a control circuit which controls switching operations of the first electric power conversion circuit and the electric power conversion circuit of field coil excite use, and
   a detector which is provided in the control circuit and detects an induced electromotive force generated in the motor generator,
   wherein, when an over current is detected, by the current detection circuit, in the first electric power conversion circuit, the control circuit turns off a switching of a phase of the first electric power conversion circuit from which the over current is detected, and turns off a switching of a phase of the electric power conversion circuit of field coil excite use, and
   after a value of the induced electromotive force by the motor generator falls below a predetermined value, the control circuit controls to stop a supply of electric power of all phases by the first electric power conversion circuit, to the motor generator.

2. The electric power conversion device according to claim 1,
   wherein the first electric power conversion circuit is an electric power conversion circuit of n phase bridge type (n is an integer greater than or equal to 3), which is composed of semiconductor switches, and
   when an over current is detected, by the current detection circuit, in a current which flows through the semiconductor switch of the electric power conversion circuit of n phase bridge type, the control circuit turns oft upper arm and lower arm semiconductor switches of a phase from which an over current is detected, and,
   as for phases from which an over current is not detected, the control circuit turns off an upper arm semiconductor switch and in addition, turns on a lower arm semiconductor switch, or turns on an upper arm semiconductor switch and in addition, turns off a lower arm semiconductor switch, and
   after an induced electromotive force which is detected bar the detector falls below a predetermined value, the control circuit turns off semiconductor switches of all phases of the electric power conversion circuit of n phase bridge type.

3. The electric power conversion device according to claim 2,
   wherein the control circuit turns off semiconductor switches of all phases of the first electric power conversion circuit, after the value of an induced electromotive force which is induced from the field coil of the motor generator to a stator coil falls below a predetermined value.

4. The electric power conversion device according to claim 2,
   wherein the control circuit turns off semiconductor switches of all phases of the first electric power conversion circuit, when a rotation number of the motor generator falls below a predetermined value, and after the value of an induced electromotive force which is induced from the field coil of the motor generator to a stator coil falls below a predetermined value.

5. The electric power conversion device according to claim 1,
wherein the first electric power conversion circuit has two or more sets of electric power conversion circuits of n phase bridge type (n is an integer greater than or equal to 3), which are each composed of semiconductor switches, and
when an over current is detected by the current detection circuit,
as for an electric power conversion circuit of n phase bridge type which has a phase from which an over current is detected, the control circuit turns off upper arm and lower arm semiconductor switches of a phase from which the over current is detected, and
as for a phase from which an over current is not detected, the control circuit turns off an upper arm semiconductor switch and in addition, turns on a lower arm semiconductor switch, or turns on an upper arm semiconductor switch and in addition, turns off a lower arm semiconductor switch, and
as for electric power conversion circuits other than the electric power conversion circuit of n phase bridge type which has a phase from which an over current is detected,
the control circuit turns off an upper arm semiconductor switch and in addition, turns on a lower arm semiconductor switch, or turns on an upper arm semiconductor switch and in addition, turns off a lower arm semiconductor switch.

6. The electric power conversion device according to claim 5,
wherein the current detection circuit determines that an over current is detected, when a state in which a value of a current which flows through the first electric power conversion circuit is larger than a predetermined value continues for more than a predetermined time.

7. The electric power conversion device according to claim 5,
wherein the control circuit turns off semiconductor switches of all phases of the first electric power conversion circuit, after the value of an induced electromotive force which is induced from the field coil of the motor generator to a stator coil falls below a predetermined value.

8. The electric power conversion device according to claim 5,
wherein the control circuit turns off semiconductor switches of all phases of the first electric power conversion circuit, when a rotation lumber of the motor generator falls below a predetermined value, and after the value of an induced electromotive force which is induced from the field coil of the motor generator to a stator coil falls below a predetermined value.

9. The electric power conversion device according to claim 5, wherein the current detection circuit determines that an over current is detected, when a state in which a value of a current which flows through the first electric power conversion circuit is larger than a predetermined value continues for more than a predetermined time.

10. The electric power conversion device according to claim 1,
wherein the first electric power conversion circuit has two or more sets of electric power conversion circuits of n phase bridge type (n is an integer greater than or equal to 3) which are each composed of semiconductor switches, and
when an over current is detected by the current detection circuit,
as for an electric power conversion circuit of n phase bridge type which has a phase from which an over current is detected,
the control circuit turns off upper arm and lower arm semiconductor switches, and
as for electric power conversion circuits other than the electric power conversion circuit of n phase bridge type which has a phase from which an over current is detected,
the control circuit turns off an upper arm semiconductor switch and in addition, turns on a lower arm semiconductor switch, or turns on an upper arm semiconductor switch and in addition, turns off a lower arm semiconductor switch.

11. The electric power conversion device according to claim 10,
wherein the control circuit turns off semiconductor switches of all phases of the first electric power conversion circuit, after the value of an induced electromotive force which is induced from the field coil of the motor generator to a stator coil falls below a predetermined value.

12. The electric power conversion device according to claim 10,
wherein the control circuit turns oft semiconductor switches of all phases of the first electric power conversion circuit, when a rotation number of the motor generator falls below a predetermined value, and after the value of an induced electromotive force which is induced from the field coil of the motor generator to a stator coil falls below a predetermined value.

13. The electric power conversion device according to claim 10,
wherein the current detection circuit determines that an over current is detected, when a state in which a value of a current which flows through the first electric power conversion circuit is larger than a predetermined value continues for more than a predetermined time.

14. The electric power conversion device according to claim 1,
wherein the control circuit turns off semiconductor switches of all phases of the first electric power conversion circuit, after the value of an induced electromotive force which is induced from the field coil of the motor generator to a stator coil falls below a predetermined value.

15. The electric power conversion device according to claim 1,
wherein the control circuit turns off semiconductor switches of all phases of the first electric power conversion circuit, when a rotation number of the motor generator falls below a predetermined value, and after the value of an induced electromotive force which is induced from the field coil of the motor generator to a stator coil falls below a predetermined value.

16. The electric power conversion device according to claim 1,
wherein the current detection circuit determines that an over current is detected, when a state in which a value of a current which flows through the first electric power conversion circuit is larger than a predetermined value continues for more than a predetermined time.

* * * * *